(12) United States Patent
Shimizu et al.

(10) Patent No.: US 7,614,471 B2
(45) Date of Patent: Nov. 10, 2009

(54) MOTORCYCLE

(75) Inventors: Masafumi Shimizu, Shizuoka-ken (JP); Tadashi Shimomura, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 131 days.

(21) Appl. No.: 11/686,782

(22) Filed: Mar. 15, 2007

(65) Prior Publication Data

US 2007/0228764 A1 Oct. 4, 2007

(30) Foreign Application Priority Data

Mar. 15, 2006 (JP) ............................. 2006-070703

(51) Int. Cl.
*G01P 3/50* (2006.01)
(52) U.S. Cl. .................... 180/219; 296/191; 362/473
(58) Field of Classification Search ............ 180/219, 180/225, 229; 296/191, 78.1, 181.2; 362/473, 362/474, 475, 476
See application file for complete search history.

(56) References Cited

U.S. PATENT DOCUMENTS 4,515,405 A * 5/1985 Ogishima ................. 296/78.1
6,158,279 A * 12/2000 Saiki .......................... 73/493
6,203,093 B1 * 3/2001 Suzuki et al. .............. 296/78.1
2004/0090306 A1 * 5/2004 Konno et al. ............... 340/5.62

FOREIGN PATENT DOCUMENTS

JP 2005-119392 5/2005
JP 2005-119392 * 12/2005

* cited by examiner

*Primary Examiner*—Lesley D Morris
*Assistant Examiner*—Levon Fiore
(74) *Attorney, Agent, or Firm*—Knobbe, Martens, Olson & Bear, LLP (57) ABSTRACT

A motorcycle having a meter device and a handlebar cover arranged to inhibit damage or the adherence of powder coating to the meter device from the handlebar cover. In one embodiment, a rear cover comprises a peripheral wall, which surrounds an outer periphery of a meter device. At least a front portion of the peripheral wall, which surrounds a front side of the meter device, comprises a first portion and a second portion. The first portion is positioned inside the front cover. An outer surface of the second portion is exposed between a rear edge of the front cover and the meter. A dimension of the first portion and the second portion are the same in a longitudinal direction of the motorcycle, or the second portion is smaller than the first portion.

14 Claims, 14 Drawing Sheets

MOTORCYCLE

RELATED APPLICATIONS

This application is related to, and claims priority from, Japanese Patent Application No. 2006-070703, filed Mar. 15, 2006, the entirety of which is hereby expressly incorporated by reference herein and made a part of the present specification.

BACKGROUND OF THE INVENTION

1. Field of the Invention

The present invention relates to a motorcycle including a handlebar cover, which surrounds a steering handlebar, and a meter device arranged on the handlebar cover.

2. Description of the Related Art

For example, a scooter type motorcycle is generally constructed so that a handlebar cover surrounds vehicle front and rear sides of a steering handlebar, and a meter device is arranged on the handlebar cover.

For example, the handlebar cover of Japanese Patent Publication No. 2005-119392 is one example of a prior art construction that is adapted to facilitate the use of a large-sized meter unit. A handlebar cover is divided into a front cover and a rear cover. The rear cover is formed with an opening that surrounds an outer peripheral surface of a meter device. A reinforcement wall is formed on a front edge of the opening. A rear edge of the front cover extends toward the meter device and covers an upper portion of the reinforcement wall, with the extended rear edge abutting against a lens of the meter device.

SUMMARY OF THE INVENTION

It has been discovered by the present inventor that the conventional motorcycle described above, in which the rear edge of the front cover extends rearward over the reinforcement wall of the rear cover and abuts against the lens of the meter device, possesses several disadvantages. For example, such a construction presents the possibility of the front cover interfering with the lens to damage the lens. Moreover, the finish of the front cover, such as a powder coating finish, tends to adhere to the lens at the time of assembling of the handlebar cover, or by as a result of vibrations caused by normal use of the motorcycle. Generally, for example, ABS resin, which is high in hardness as compared with a rear cover, is adopted for a front cover and a finish or coating (such as a powder coating) is applied thereto to improve an outward appearance of the front cover. Striking against a lens, such a front cover damages the latter and causes powder coating to adhere to the lens.

Preferred embodiments of the present invention provides a motorcycle capable of adopting a large-sized meter unit, while at the same time inhibiting the meter device from being damaged or resulting in the adherence of powder coating to the meter unit.

An aspect of the present invention involves a motorcycle including a front cover and a rear cover. The front cover covers a steering handlebar from the front of the motorcycle. The rear cover covers the steering handlebar from the rear of the motorcycle 1. A meter device is arranged to be surrounded by the rear cover and the front cover. The rear cover comprises a peripheral wall, which surrounds an outer periphery of the meter device. A front portion of the peripheral wall, which surrounds a front side of the meter device, comprises a first portion and a second portion. The first portion is located inside the front cover. An outer surface of the second portion is exposed between a rear edge of the front cover and the meter device. A dimension of the first portion and the second portion in a longitudinal direction of the motorcycle are the same, or the second portion is smaller than the first portion.

With such a motorcycle, the second portion of the front portion of the rear cover, which surrounds a front side of the meter device, is exposed outside from between the rear edge of the front cover and the meter device. A clearance space, or gap, between the front cover and the meter device is filled from underneath by the peripheral wall front portion, so that it is possible to prevent the front cover from contacting the meter device. Consequently, it is possible to inhibit or prevent the front cover from damaging the meter device and powder coating from adhering to the meter device, while still providing an attractive outward appearance.

BRIEF DESCRIPTION OF THE DRAWINGS

These, and other features, aspects and advantages of the present invention are described below with reference to drawings of a preferred embodiment, which is intended to illustrate, but not to limit the present invention. The drawings contain fourteen (14) figures.

DETAILED DESCRIPTION OF THE PREFERRED EMBODIMENT

FIGS. 1 to 14 illustrate a motorcycle having certain features, aspects and advantages of the present invention. Front and rear, and left and right referred to in the following description of the illustrated embodiment refer to front and rear, and left and right directions as seen in a state of being seated on a seat of the motorcycle. Furthermore, a longitudinal direction refers to a front to rear direction relative to the motorcycle, while a lateral direction refers generally to a side to side, or left to right, direction relative to the motorcycle. In addition, heights may be expressed as elevations from a surface upon which the motorcycle rests.

Figure 1:
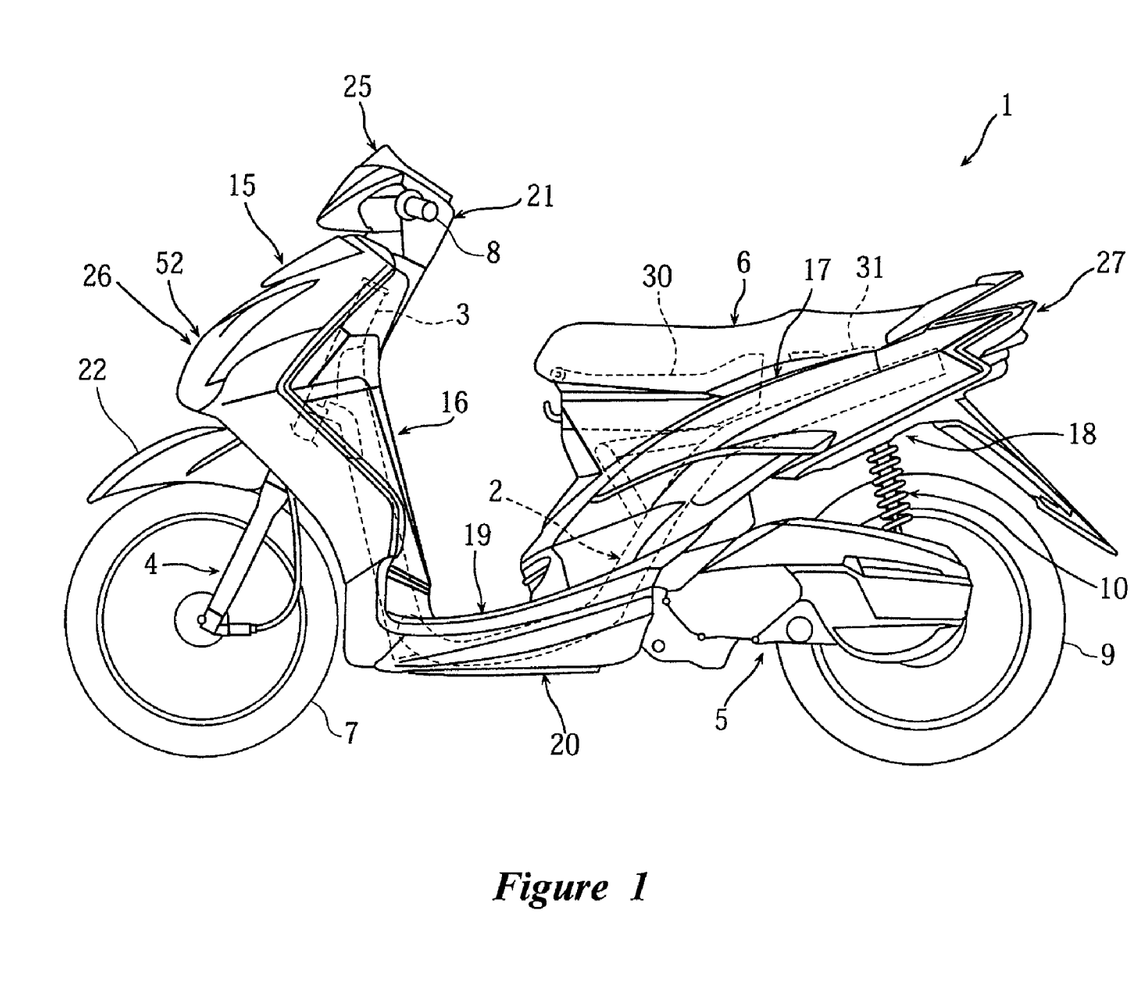
FIG. 1 is a side view of a motorcycle having certain features, aspects and advantages of the present invention.

In the drawings, the reference numeral 1 denotes a scooter type motorcycle including a generally U-shaped "step through" style body frame 2. A front fork 4 is pivotally supported by a head pipe 3 positioned at a front end of the body frame 2 to be steerable left and right. A swing-type engine unit 5 is pivotally supported centrally of the body frame 2 to be swingable vertically. A saddle style seat 6 is mounted on the body frame 2 above the engine unit 5. Preferably, the seat 6 accommodates two riders.

A front wheel 7 is journaled at a lower end of the front fork 4. A steering mechanism, such as a steering handlebar 8, is fixed to an upper end of the front fork 4. A front fender 22 is arranged on the front fork 4 to cover an upper portion of the front wheel 7.

A rear wheel 9 is journaled at a rear end of the engine unit 5. A rear cushion, such as a shock absorber 10, is arranged between the engine unit 5 and the body frame 2.

A storage box 30 and a fuel tank 31, respectively, are arranged longitudinally in parallel below the seat 6. A front end of the seat 6 is supported by the storage box 30 to be able to rotate in a vertical direction to permit access to the storage box 30.

A front side of the body frame 2 forward of the head pipe 3 is covered by a front cover 15 and a rear side thereof is covered by a leg shield 16. Also, a lower portion of a periphery of the seat 6 is covered by left and right side covers 17, 17. A rear fender 18 is arranged on undersides of the left and right side covers 17, 17 to cover an upper portion of the rear wheel 9.

A foot board 19, on which an occupant can place his or her feet, is arranged between the leg shield 16 and the left and right side covers 17. A lower side of the foot board 19 is covered by an undercover 20. A taillight device 27 is arranged at rear ends of the left and right side covers 17, 17.

Figure 2:
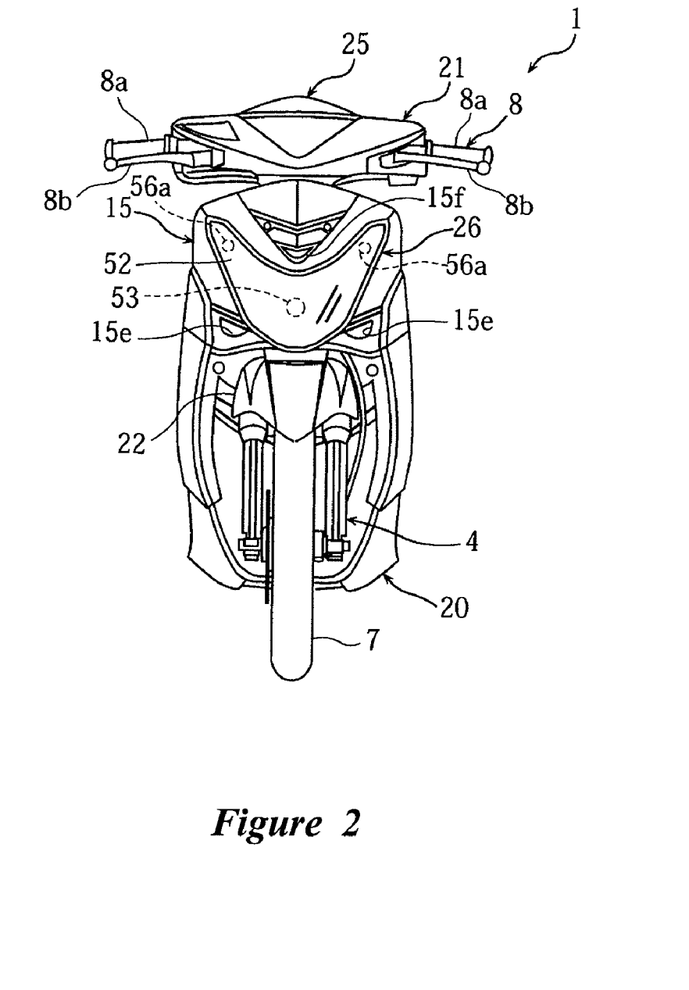
FIG. 2 is a front view of the motorcycle of FIG. 1.
Figure 3:
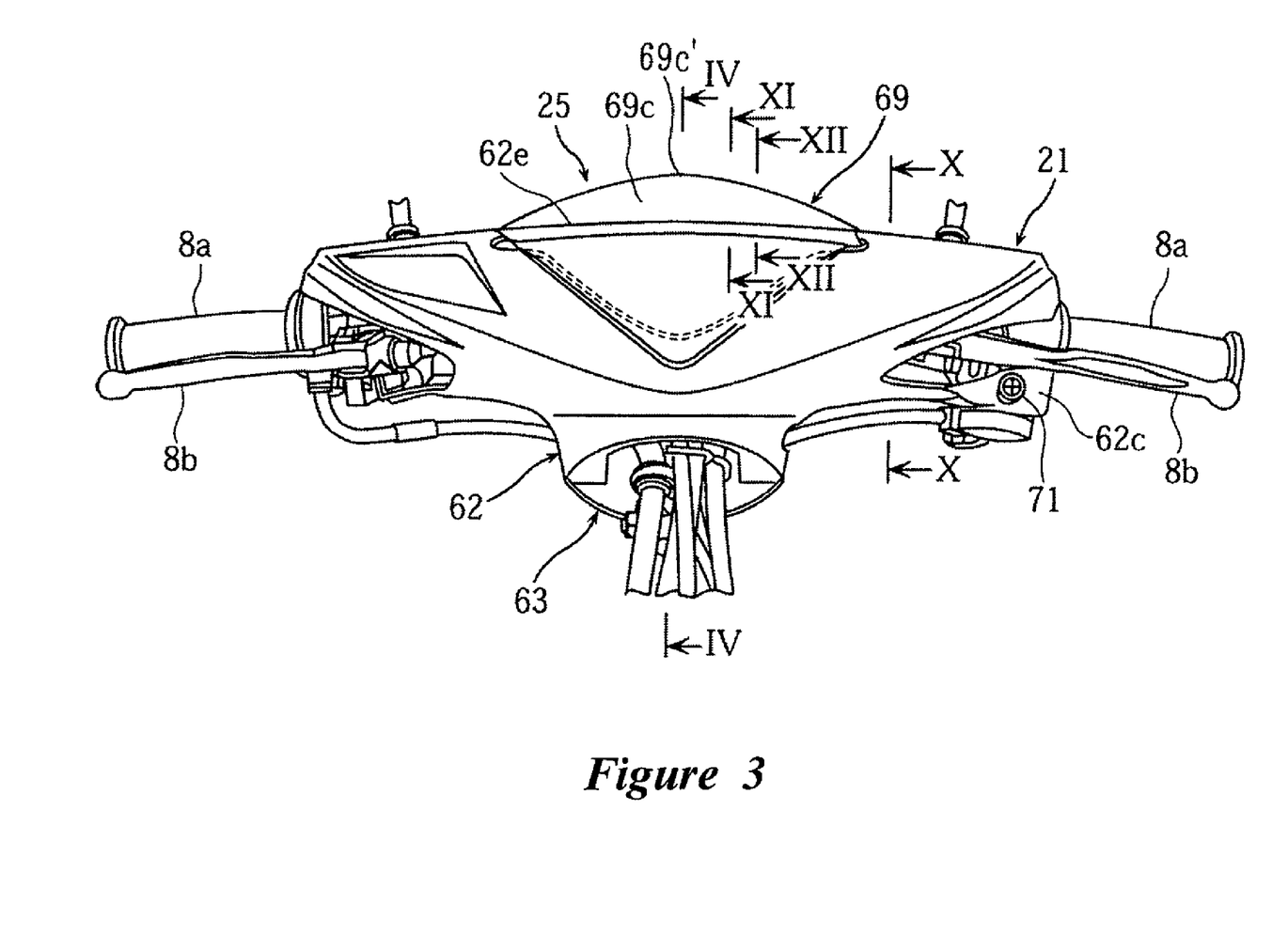
FIG. 3 is a front view of a handlebar cover of the motorcycle.

A headlight device 26 is arranged on the front cover 15. The headlight device 26 comprises a lens 52, which preferably is substantially V-shaped as viewed from the front of the motorcycle 1. A headlight bulb 53 is arranged centrally relative to the lens 62. Flasher bulbs 56a, 56a are arranged at respective left and right upper ends of the V-shaped lens 52. Also, a preferably V-shaped horn opening 15f is formed on the V-shaped lens 52 of the front cover 15. Air duct portions 15e, 15e are formed at left and right, lower ends of the front cover 15.

A handlebar cover 21 is mounted to the steering handlebar 8 and generally surrounds a periphery of the steering handlebar 8. The handlebar cover 21 covers a central portion of the steering handlebar 8 in the motorcycle 1 width direction so that left and right grips 8a, 8a and brake levers 8b, 8b on the steering handlebar 8 are exposed to the outside of the cover 21. In the illustrated embodiment, the steering handlebar 8 is constructed from a continuous steel tube that may be bent into a desired shape. That is, a single component defines the portions of the steering handlebar 8 that supports the left and right grips 8a, 8a (FIGS. 2 and 3), as well as an intermediate portion of the steering handlebar 8 that is coupled to the upper end of the front fork 4. In an alternative arrangement, the steering handlebar 8 may be constructed from multiple components. For example, the steering handlebar 8 may include separate right and left portions, each of which are coupled to the upper end of the front fork 4. In such an arrangement, it is preferred that the separate right and left handlebar portions are constructed from aluminum tubes. However, other suitable materials may also be used.

Figure 13:
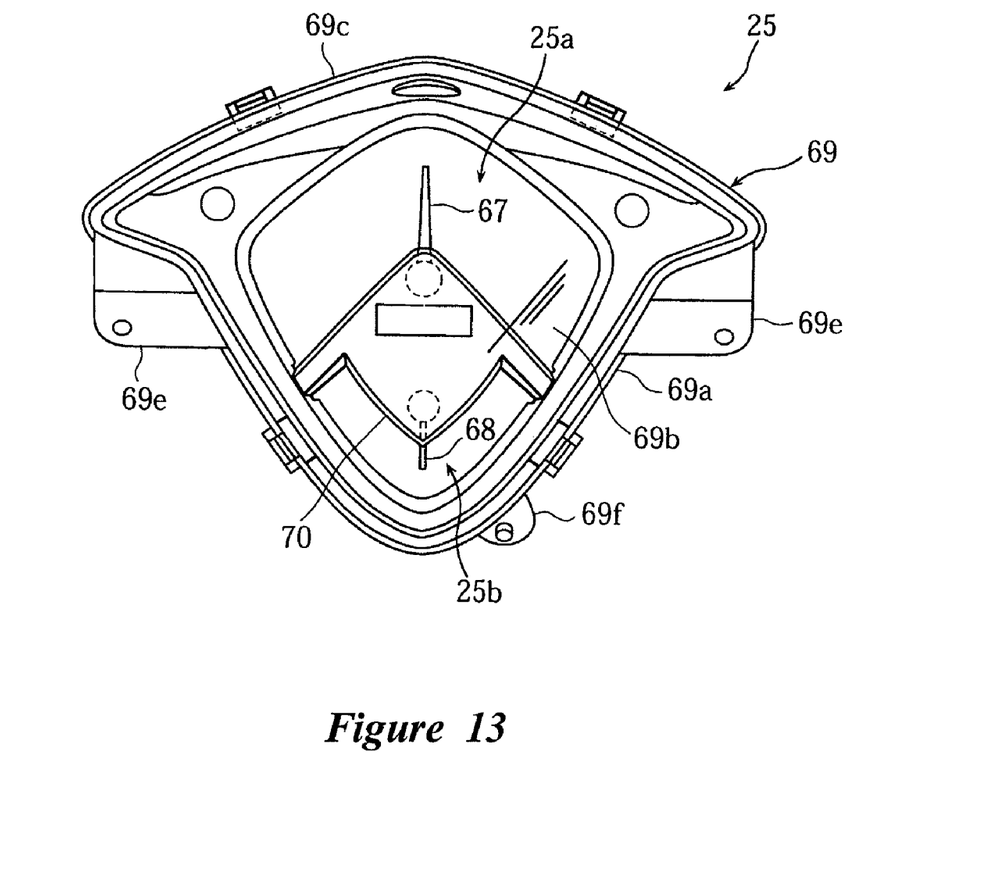
FIG. 13 is a plan view of a meter device arranged on the handlebar cover.
Figure 14:
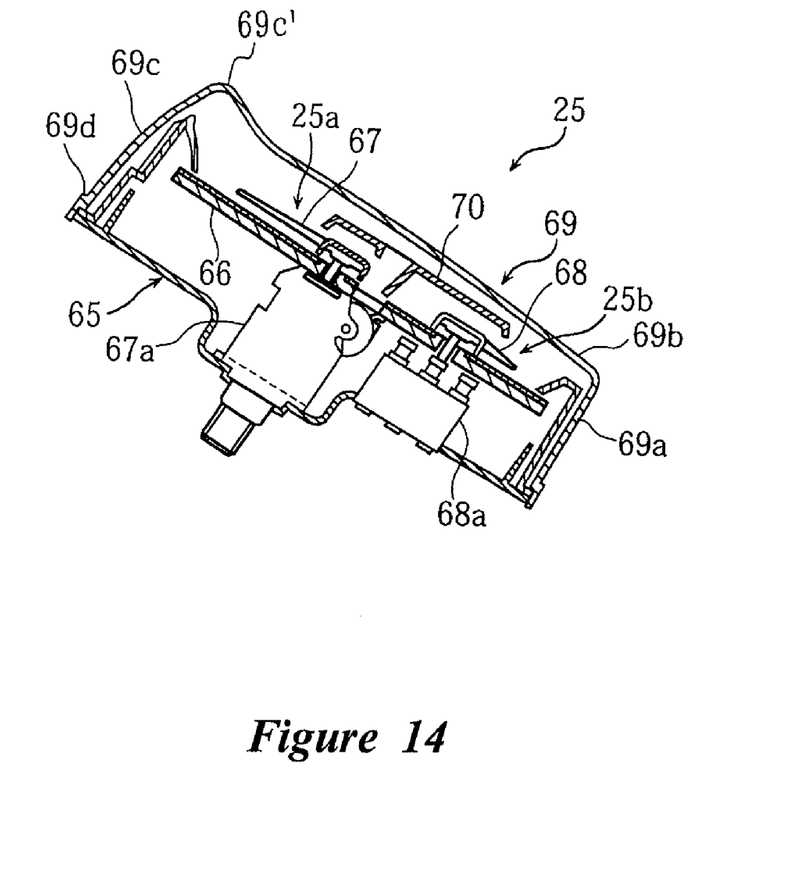
FIG. 14 is a cross-sectional view of the meter device.

Arranged on the handlebar cover 21 is a meter device 25, including a speedometer 25a, a fuel level meter 25b, etc. The meter device 25 is constructed such that an indicator panel 66, a speed indicator needle 67, a fuel level needle 68, and drive units 67a, 68a, which drive the respective needles 67, 68, are arranged in a meter casing 65. A clear lens 69, preferably made of an acrylic resin, covers the meter casing 65. Supports for the speed indicator needle 67 and the fuel level needle 68 are covered by a cover 70.

The clear lens 69 is substantially bowl-shaped to comprise a peripheral wall portion 69a, which surrounds a periphery of the meter casing 65, and an upper wall portion 69b, which covers an upper portion of the meter casing 65. The peripheral wall portion 69a is formed on left and right sides and a rear portion, respectively, thereof with mounts 69e, 69e, 69f and on a lower edge thereof with a step 69d, which restricts downward movements of a rear cover 63, which is described in detail below.

A visor-shaped projecting portion 69c' is formed on a front wall portion 69c of the peripheral wall portion 69a to project upward above the upper wall portion 69b. The projecting portion 69c' projects above the handlebar cover 21. The projecting portion 69c' is curved in the motorcycle width direction, being at its highest centrally in the motorcycle width direction and gradually decreased in height toward left and right sides from the central portion. In addition, the projecting portion 69c' is substantially arcuate-shaped as viewed from above, with the left and right sides being rearward of the center. Further, the front wall portion 69c and hence the projecting portion 69c' are inclined obliquely rearward to define a plane in substantially parallel to a front side wall portion 62a of a front cover 62 (described below) as viewed from the side. Thereby, during movement of the motorcycle 1, wind flows upward along the front wall portion 69c and the projecting portion 69c' of the clear lens 69 from the front side wall portion 62a of the front cover 62, so that the front cover 62 and a front portion of the clear lens 69 function as a visor.

The handlebar cover 21 is divided into the front cover 62, which preferably is made of ABC resin to cover the steering handlebar 8 from the front of the motorcycle 1, and the rear cover 63, which is made of PP resin to cover the steering handlebar 8 from the rear of the motorcycle 1. As viewed in a state in which the handlebar cover 21 is mounted to the steering handlebar 8 (see FIG. 10), a direction "a", in which a mold for the front cover 62 is removed, is substantially horizontal and a direction "b", in which a mold for the rear cover 63 is removed, is inclined slightly upward in a rearward direction.

Figure 5:
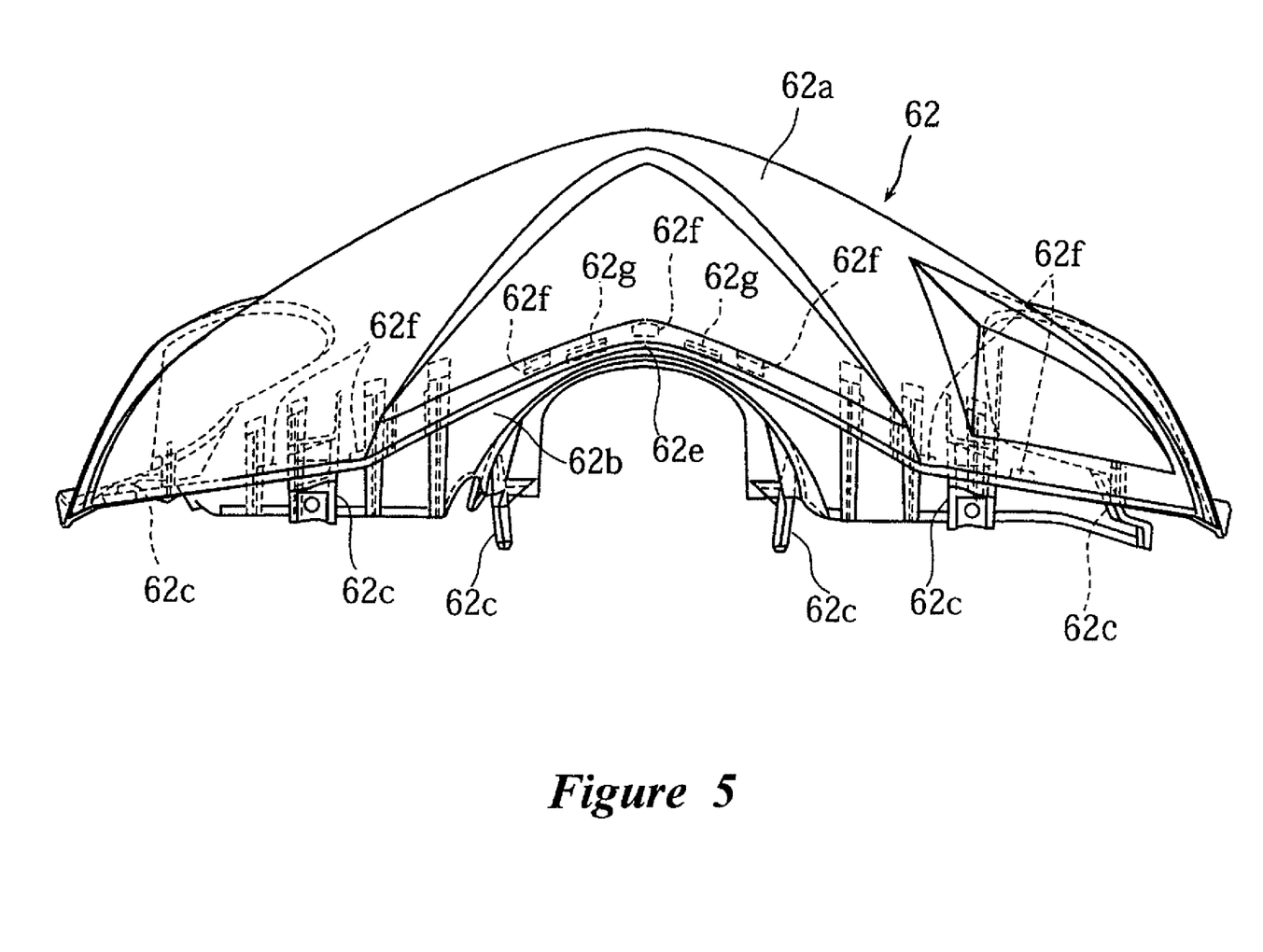
FIG. 5 is a plan view of a front cover of the handlebar cover of FIG. 3.
Figure 6:
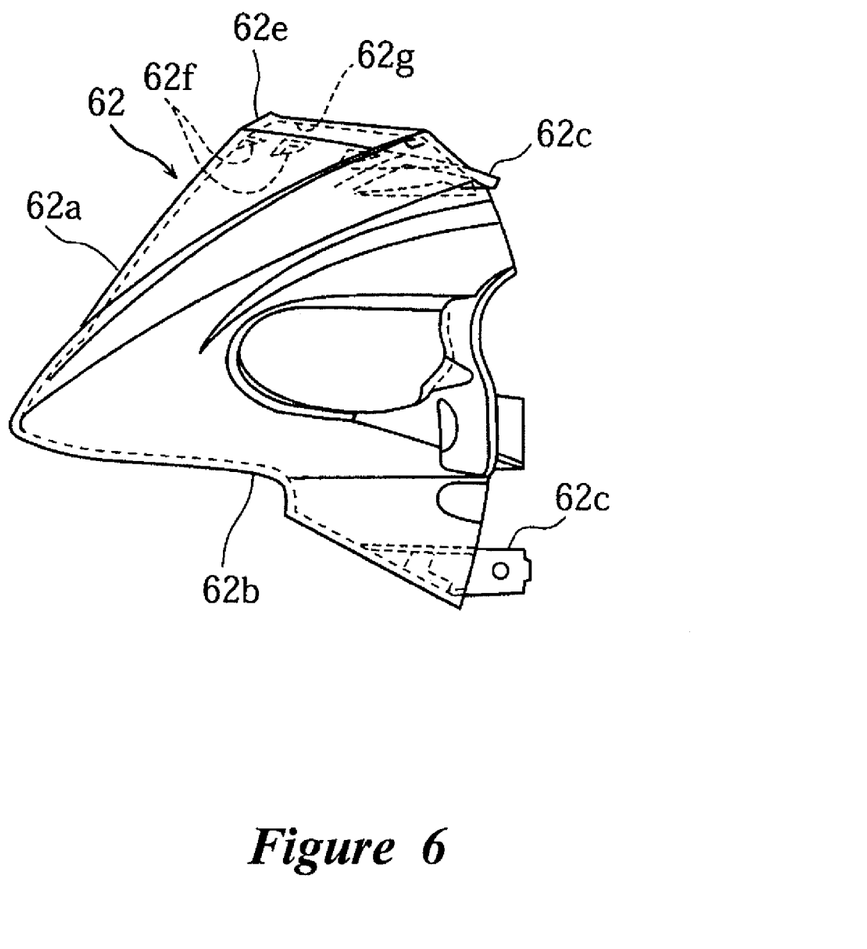
FIG. 6 is a side view of the front cover.

The front cover 62 has a transverse cross section, which is substantially beak-shaped as viewed from the side. The front cover 62 includes a front side wall portion 62a, which is inclined downward in a forward direction to cover a front portion of the steering handlebar 8, and a bottom wall portion 62b, which extends rearward from a lower end of the front side wall portion 62a to cover a lower portion of the steering handlebar 8, thus opening rearwardly. A finish or coating, such as a powder coating, is applied to a surface of the front cover 62 to improve an outward appearance of the cover 62.

Figure 7:
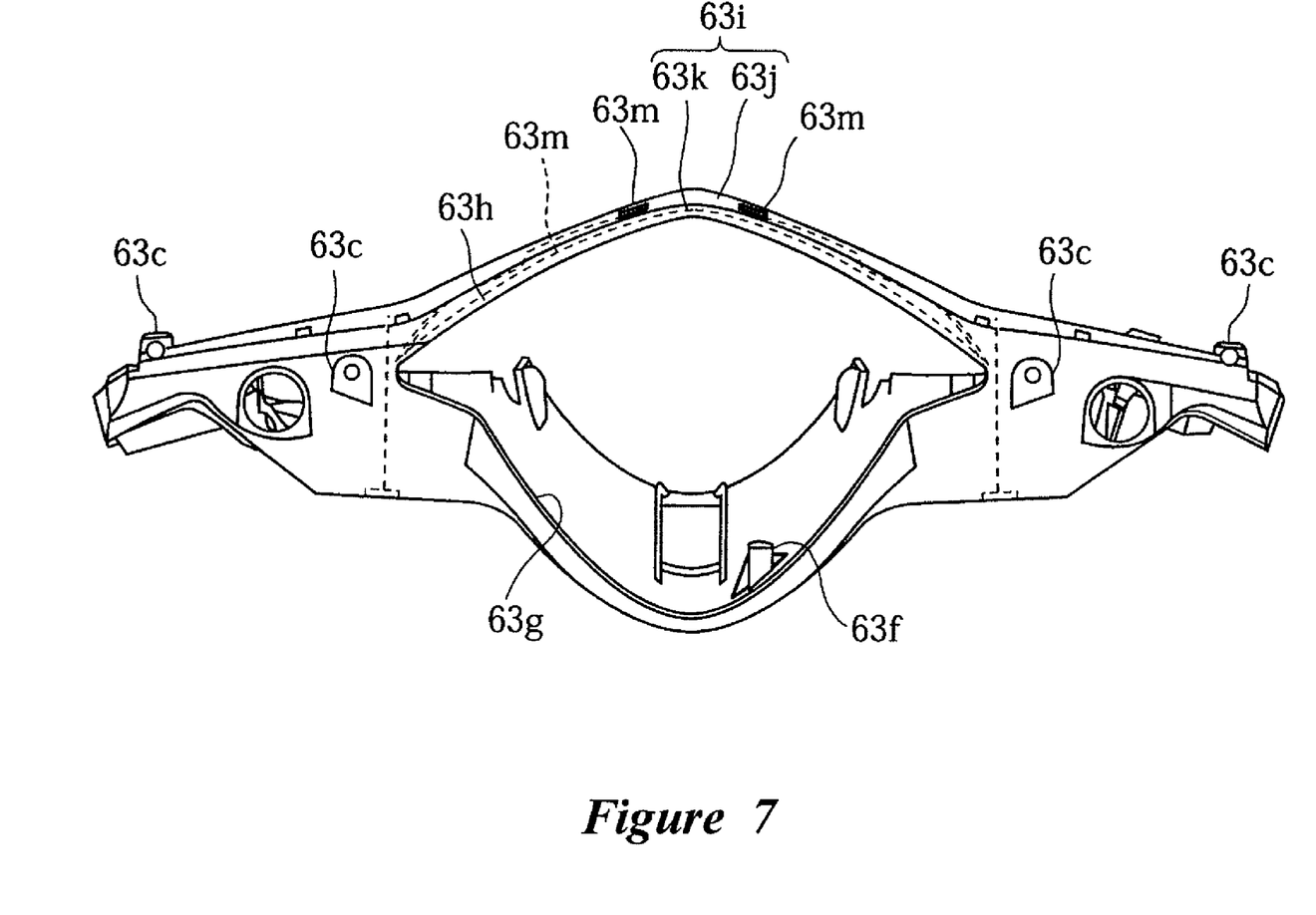
FIG. 7 is a plan view of a rear cover of the handlebar cover of FIG. 3.
Figure 8:
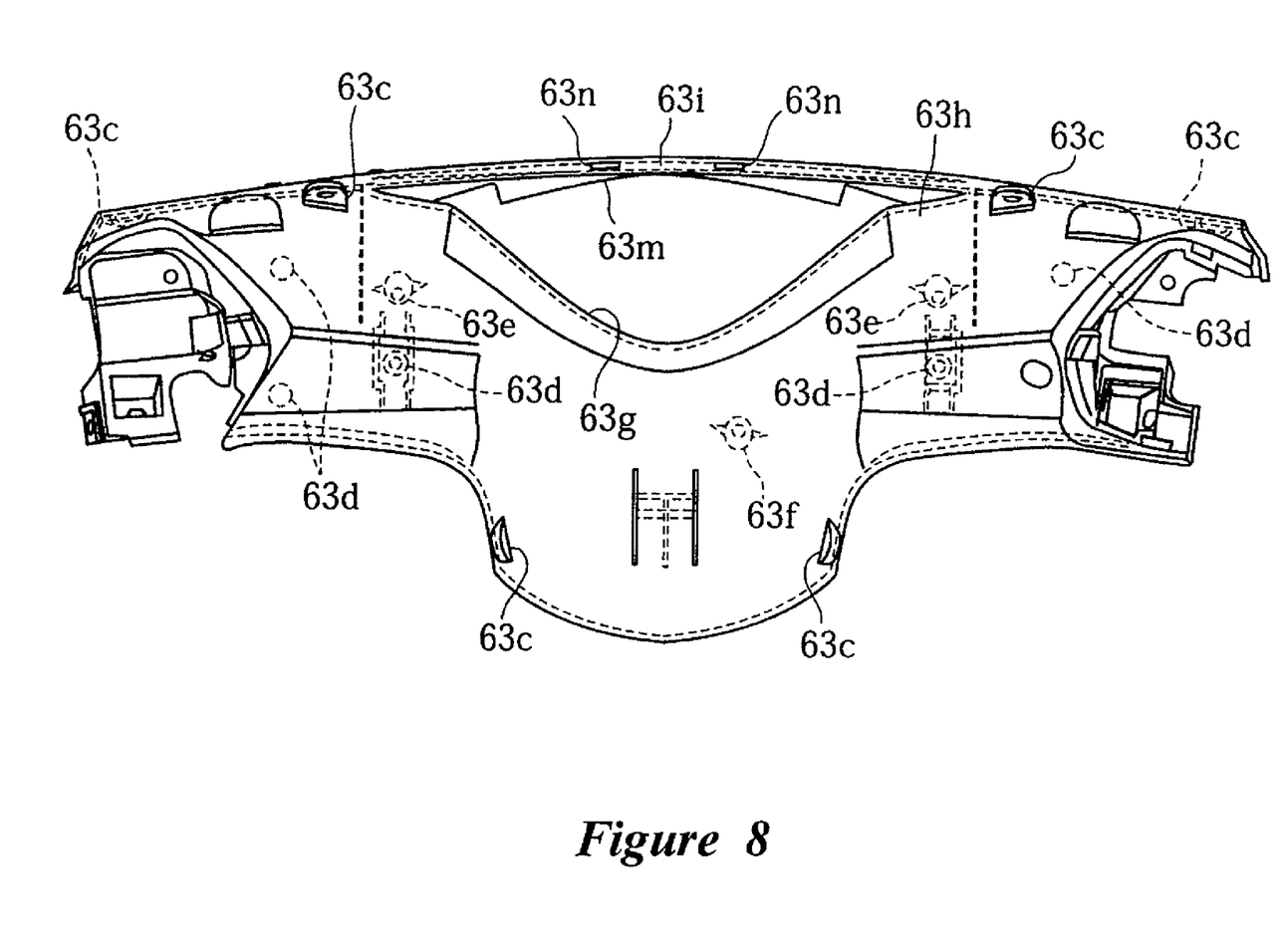
FIG. 8 is a rear view of the rear cover.
Figure 9:
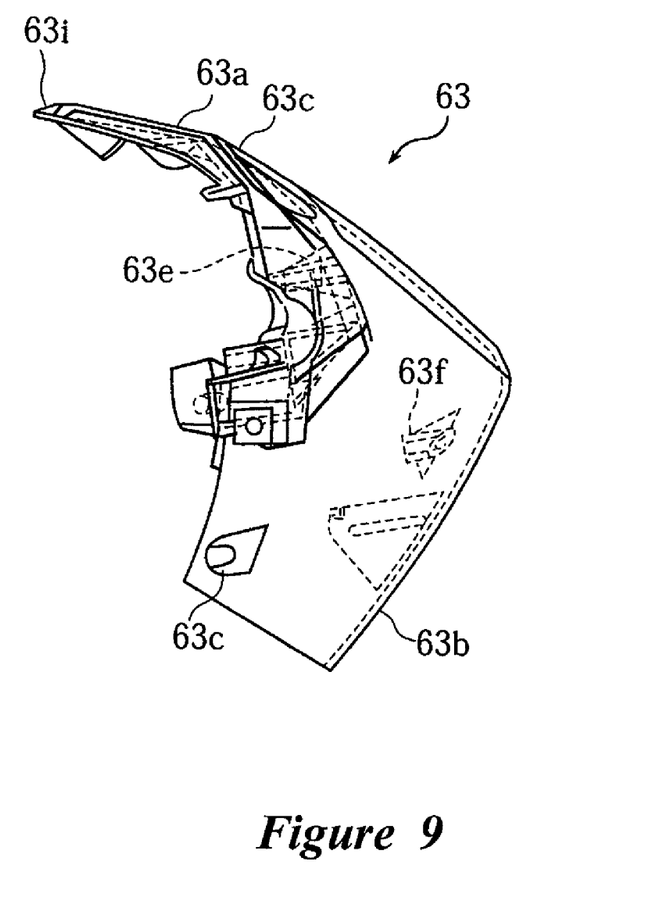
FIG. 9 is a side view of the rear cover.
Figure 10:
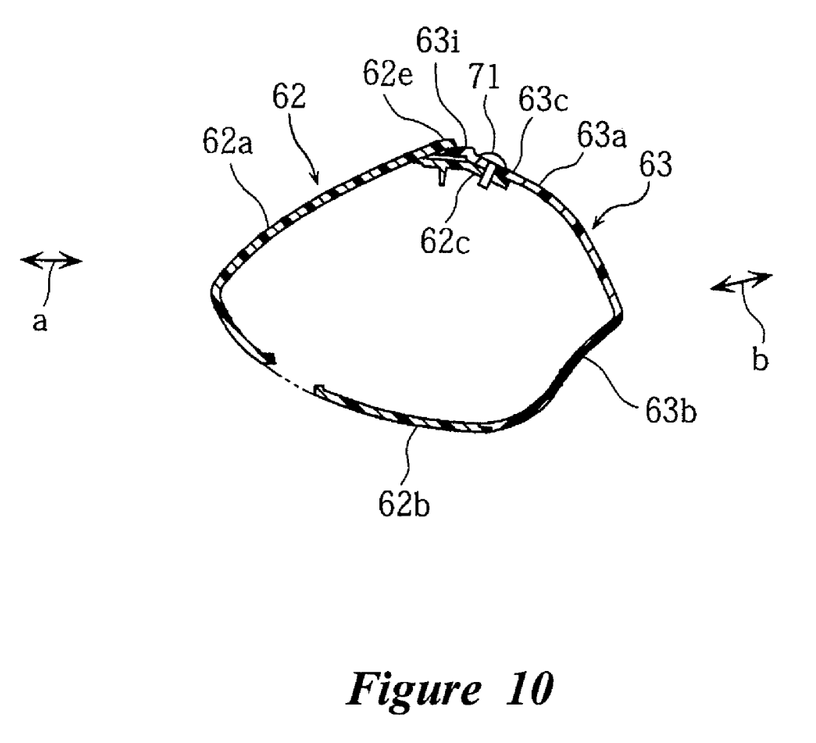
FIG. 10 is a cross-sectional view (cross-sectional view taken along the line X-X in FIG. 3) of the handlebar cover.
Figure 11:
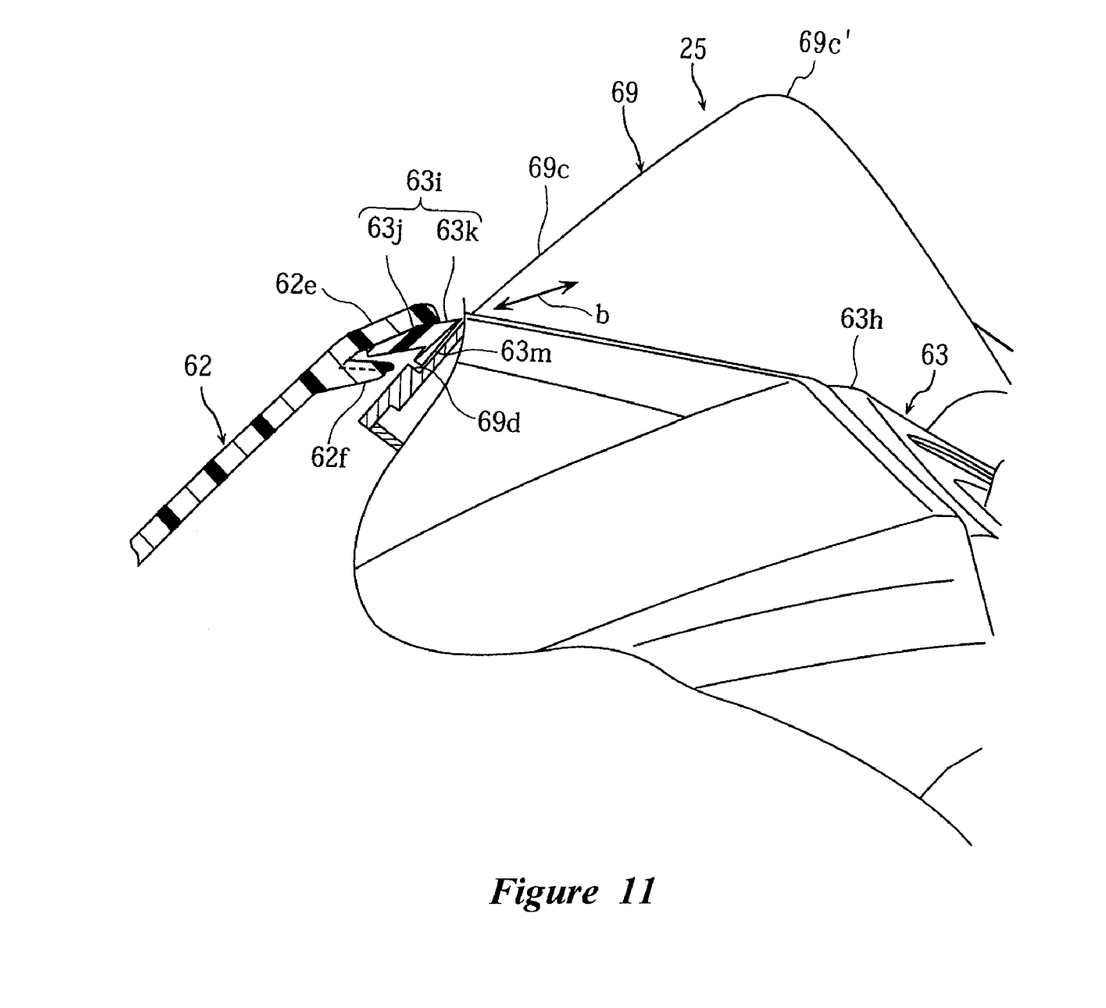
FIG. 11 is a cross-sectional view (cross-sectional view taken along the line XI-XI in FIG. 3) of the handlebar cover.
Figure 12:
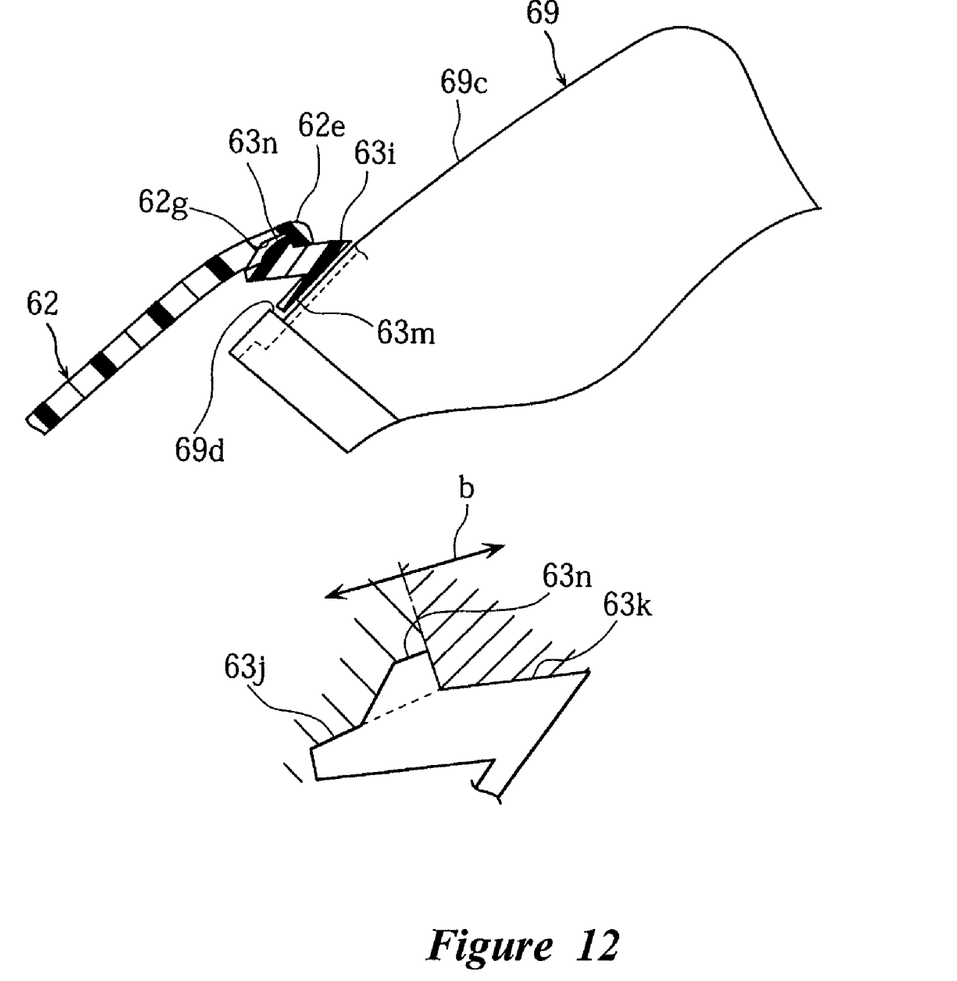
FIG. 12 is a cross-sectional view (cross-sectional view taken along the line XII-XII in FIG. 3) of the handlebar cover.

The rear cover 63 includes an upper wall portion 63a, which covers an upper portion of the steering handlebar 8, and a rear wall portion 63b, which extends downward from a rear end of the upper wall portion 63a to cover a rear portion of the steering handlebar 8, thus opening forwardly.

A plurality of front mount seats or tabs 62c are formed at vertical and left and right intervals on an opening edge of the front cover 62. Rear mount seats or tabs 63c are formed on those portions of the rear cover 63, which correspond to the respective front mount tabs 62c. The front cover 62 is assembled to the rear cover 63 from the front and mounted detachably to the rear cover 63 by fixing the respective front mount tabs 62c of the front cover 62 to the rear mount tabs 63c with fasteners, such as screws 71.

Forwardly-projecting cylindrical-shaped fixing portions 63d are formed on left and right sides of the rear cover 63. The rear cover 63 is fixed detachably to the steering handlebar 8 by clamping the respective fixing portions 63d to a bracket (not shown) of the steering handlebar 8 with fasteners, or mount screws (not shown), which are inserted from the front.

Forwardly projecting cylindrical-shaped mount bosses 63e, 63f are formed on those portions of the rear cover 63, which correspond to the respective mounts 69e, 69e, 69f of the clear lens 69. The meter device 25 is fixed to the rear cover 63 by clamping the respective mount bosses 69e, 69f to the mount bosses 63e, 63e, 63f of the rear cover 63 with mount screws (not shown), which are inserted from the front.

In order to assemble the handlebar cover 21, the meter device 25 is assembled to the rear cover 63, the rear cover 63 is arranged on the steering handlebar 8, and assembly is carried out from the front with the use of a clamping tool (not shown). Thereafter, the front cover 62 is assembled to the rear cover 63 from the front.

A meter opening 63g is formed on the upper wall portion 63a of the rear cover 63 to be sized to extend over a substantially whole area of the upper wall portion 63a. A peripheral wall 63h, which forms an opening peripheral edge of the meter opening 63g, surrounds an outer peripheral surface of the clear lens 69 of the meter device 25.

A peripheral wall front portion 63i, which forms a front portion of the meter opening 63g, projects forward in a manner to enter toward the front cover 62 and generally defines a single plane free of any step over a whole width of the meter opening 63g. In a preferred embodiment, the front portion 63i is relatively, but not entirely flat. That is, the front portion 63i does not include surfaces that are substantially orthogonal to one another, which would normally be referred to as a step.

Figure 4:
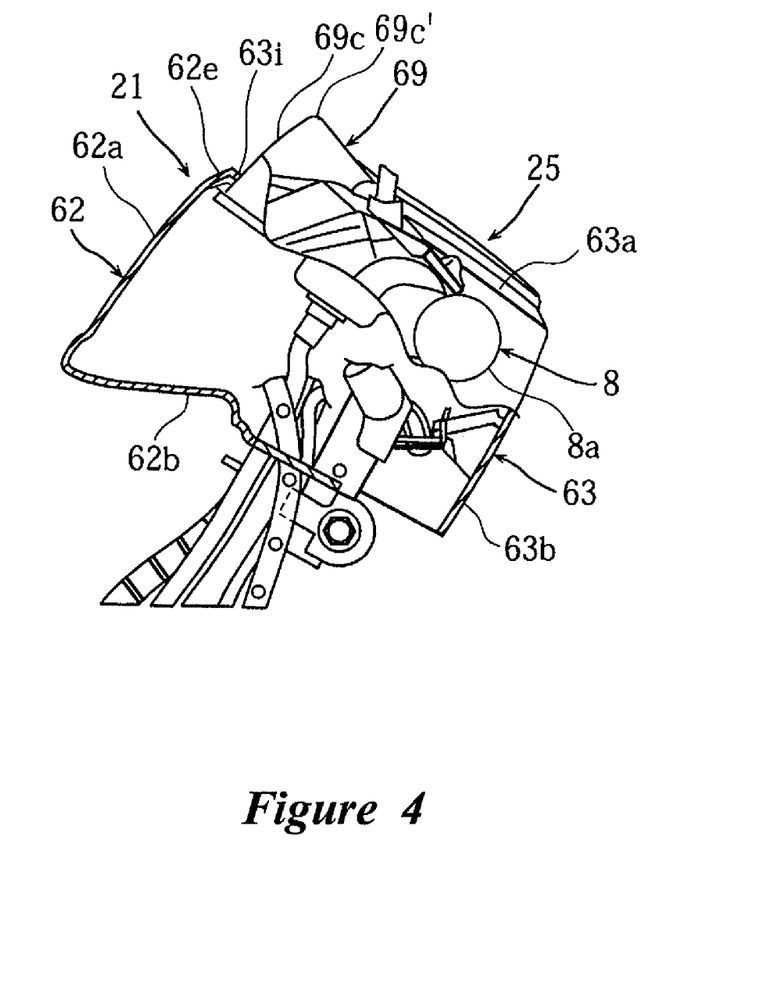
FIG. 4 is a cross-sectional view (cross-sectional view taken along the line IV-IV in FIG. 3) of the handlebar cover.

The peripheral wall front portion 63i comprises a front edge (first portion) 63j and a rear edge (second portion) 63k. The front edge 63j forms an inclination equal to that of a rear edge 62e of the front cover 62 and larger than the mold removal direction "b" and is covered by the rear edge 62e. The rear edge (second portion) 63k forms an inclination that is a slightly smaller than that of the front edge 63j and the mold removal direction "b". The first portion 63j enters inside the rear edge 62e of the front cover 62, that is, in a manner to contact with a lower surface of the rear edge 62e. Also, the first portion 63j and the second portion 63k are configured dimensionally in a longitudinal direction of the motorcycle 1 so that the second portion 63k is smaller than the former. In addition, the both portions may be set to be equivalent to each other in a longitudinal dimension. An upward-facing surface of the rear edge 63k is exposed between the rear edge 62e of the front cover 62 and the front portion 69c of the clear lens 69 of the meter device 25. Also, the rear edge 63k is positioned below an uppermost surface portion of the rear edge 62e of the front cover 62, which is positioned outside, that is, above the front edge 63j. In addition, both the front edge 63j and the rear edge 63k of the peripheral wall front portion 63i are inclined upward in a rearward direction to the mold removal direction "b" and the longitudinal direction of the motorcycle 1 (the horizontal).

A wall portion 63m is formed integrally on a rear edge of a lower surface of the peripheral wall front portion 63i toward the meter device 25 to extend in a different direction from the rear edge 63k of the peripheral wall front portion 63i. Specifically, in the illustrated arrangement, the wall portion 63m extends in a generally downward direction and is referred to herein for convenience as a vertical wall portion 63m. The vertical wall portion 63m is formed with some clearance between it and the front portion 69c of the clear lens 69. Also, the vertical wall portion 63m extends in a direction inside the rear cover 63, that is, downward with an edge of the rear edge 63k of the rear cover 63 toward the meter device being a point at any location along the rear edge 63k. Thus, the rear edge 63k defines a sharp edge or a line, with little thickness. Furthermore, the vertical wall portion 63m is smaller in wall thickness than the peripheral wall front portion 63i.

A lower end surface of the vertical wall portion 63m is opposed to the step 69d of the clear lens 69. Thereby, when the peripheral wall front portion 63i of the rear cover 63 is moved downward due to deformation, the vertical wall portion 63m abuts against the step 69d to restrict downward deformation of the peripheral wall front portion 63i.

Formed between the peripheral wall front portion 63i of the rear cover 63 and the rear edge 62e of the front cover 62 is a stopper portion, or stop, that inhibits the rear edge 62e of the front cover 62 from moving toward the meter device 25. The stopper portion comprises rearwardly projecting tongue-shaped stopper pieces 62f formed on the rear edge 62e of the front cover 62 with a predetermined spacing in the vehicle width direction (see FIG. 11). A front edge of the peripheral wall front portion 63i abuts against the respective stopper pieces 62f whereby the front cover 62 is prevented from moving rearward.

Formed between the peripheral wall front portion 63i of the rear cover 63 and the rear edge 62e of the front cover 62 is an inhibition part that inhibits the rear edge 62e of the front cover 62 from moving in a direction (forward) away from the meter device 25. The inhibition part comprises a pair of left and right recesses 62g, 62g formed centrally of the rear edge 62e of the front cover 62 in the vehicle width direction, and a pair of left and right projections 63n, 63n formed on the front edge 63j of the peripheral wall front portion 63i (see FIG. 12). The projections 63n engage with the recesses 62g whereby the front cover 62 is prevented from moving forward.

According to the illustrated embodiment, since the rear edge 63k of the peripheral wall front portion 63i, which surrounds a front side of the meter device 25 on the rear cover 63, is exposed between the rear edge 62e of the front cover 62 and the clear lens 69 of the meter device 25, a clearance space between the front cover 62 and the clear lens 69 is formed, so that it is possible to prevent the rear edge 62e of the front cover 62 from interfering with the clear lens 69. Consequently, it is possible to inhibit or prevent the front cover 62 from damaging the clear lens 69 and powder coating from adhering to the clear lens 69, thus enabling avoiding deterioration in the outward appearance of the meter device 25.

Also, since the rear edge 63i of the rear cover 63 is positioned below an upper end of the rear edge 62e of the front cover 62, the rear edge 63i of the rear cover 63 is hidden by the rear edge 62e of the front cover 62 as viewed from the front of the motorcycle 1, so that the front cover 62 looks as if it contacts directly with the meter device 25 in a state, in which the meter device 25 is fitted into the opened part, thus making the outward appearance simple and attractive.

Also, the peripheral wall 63h of the rear cover 63 surrounds a whole periphery of the meter device 25 so as to avoid a design in which the meter device 25 is parted by a parting line of the rear cover 63 and the front cover 62. Thus, because the rear cover 63 surrounds the entire periphery of the meter device 25, a design is provided in which the handlebar cover 21 and the meter device 25 are made unitary, thus providing a novel, outward appearance. Incidentally, with a construction in which the front cover surrounds the front side of the meter device and the rear cover surrounds the rear side thereof, the meter device will be positioned on a parting line of the handlebar cover, so that a unitary design is not provided.

According to the illustrated embodiment, since the front edge 63j and the rear edge 63k of the peripheral wall front portion 63i generally define a single plane, i.e., without a step, over a whole width in the vehicle width direction and the single plane is inclined rearwardly upward in a direction in which the front cover 62 is assembled, the peripheral wall front portion 63i guides the rear edge 62e of the front cover 62 in assembling of the front cover 62, so that it is possible to readily carry out assembling of the front cover 62 to the rear cover 63.

According to the illustrated embodiment, since the vertical wall portion 63m extending downward is formed integral with the rear edge 63k of the peripheral wall front portion 63i, the peripheral wall front portion 63i of the rear cover 63 can be improved in stiffness.

Also, since the vertical wall portion 63m is formed with some clearance between it and the front portion 69c of the clear lens 69 and along the front portion 69c, the clearance makes it possible to readily carry out assembling of the meter device 25 and to heighten the peripheral wall front portion 63i of the rear cover 63 in stiffness in a direction along the outer peripheral surface of the meter device 25. Thereby, it is possible to prevent deformation of the peripheral wall front portion 63i, thus improving the quality of the motorcycle 1.

Since the vertical wall portion 63m is extended downward from the rear edge 63k, the vertical wall portion 63m is unseen from outside and deterioration in outward appearance is not caused. Also, since the vertical wall portion 63m is formed to be thinner than the peripheral wall front portion 63i, it is possible to prevent shrinkage caused by formation of the vertical wall portion 63m, thus avoiding deterioration in the outward appearance when the peripheral wall front portion 63i is exposed.

According to the illustrated embodiment, since the step 69d, against which the vertical wall portion 63m abuts, is formed on the lower edge of the clear lens 69 of the meter device 25, it is possible to restrict downward deformation of the peripheral wall 63h of the rear cover 63.

According to the illustrated embodiment, since the stop, comprising the stopper pieces 62f, is formed between the peripheral wall front portion 63i of the rear cover 63 and the rear edge 62e of the front cover 62 to inhibit the rear edge 62e of the front cover 62 from moving toward the meter device 25, it is possible to prevent the rear edge 62e of the front cover 62 from interfering with the clear lens 69.

Since the inhibition part comprising the recesses 62g, 62g and the projections 63n, 63n is formed between the peripheral wall front portion 63i of the rear cover 63 and the rear edge 62e of the front cover 62 to inhibit the rear edge 62e of the front cover 62 from moving in a direction away from the meter device 25, it is possible to prevent forward deformation of the front cover 62 and deterioration in outward appearance due to opening at an intersection, or parting location, thereof with the rear cover 63.

Also, since the projecting portion 69c' functioning as a visor is formed on the clear lens 69 of the meter device 25, it is possible to make the outward appearance simple. More specifically, in the case where a visor-shaped projecting portion is formed, it is usually provided on that portion of a meter, which is a part of the rear cover and is positioned on the front. In this case, both a front cover and a rear cover, which is made large in size corresponding to a visor, are present on the front of a meter, so that they are hard to be made simple in design. According to the embodiment, since the projecting portion 69c' is formed on the clear lens 69 of the meter device 25, a portion of the rear cover 63 forwardly of the meter device 25 can be set to a small dimension as if it is not existent, so that it is possible to make the outward appearance simple. Also, since the display part and the projecting portion 69c' on the meter device 25 are formed by the clear lens 69, which is a single part forming an outer surface of a meter, the outward appearance is made simple.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present motorcycle has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A motorcycle, comprising:
   a front cover;
   a rear cover; the front cover covering a handlebar from the front of the motorcycle and the rear cover covering the handlebar from the rear of motorcycle; and
   a meter device surrounded by the front cover and the rear cover;
   wherein the rear cover comprises a peripheral wall surrounding a periphery of the meter device, at least a front portion of the peripheral wall, which surrounds a front side of the meter device, comprises a first portion and a second portion, the first portion is positioned inside the front cover such that the front cover overlaps the first portion and the first portion is not outwardly exposed, an outer surface of the second portion is outwardly exposed between a rear edge of the front cover and the meter device, and a dimension of the second portion is equal to or smaller than a dimension of the first portion in a longitudinal direction of the motorcycle;
   wherein an uppermost surface of the second portion is positioned below, relative to a vertical direction, an uppermost edge of a corresponding portion of the front cover positioned above the first portion.

2. The motorcycle of claim 1, wherein the second portion of the rear cover is upwardly inclined in a direction in which the front cover is assembled.

3. The motorcycle of claim 1, wherein the second portion of the rear cover is upwardly inclined in a longitudinal direction of the motorcycle.

4. The motorcycle of claim 1, further comprising a wall portion extending from an edge of the second portion of the rear cover facing the meter device in a direction different from the second portion.

5. The motorcycle of claim 4, wherein the wall portion extends along an outer surface of the meter device.

6. The motorcycle of claim 5, wherein the wall portion is thinner than the second portion.

7. The motorcycle of claim 4, wherein the wall portion extends in a direction towards an inside of the rear cover and the edge of the second portion defines a point at any location along a length of the front portion.

8. The motorcycle of claim 7, wherein the wall portion is thinner than the second portion.

9. The motorcycle of claim 1, wherein the meter device comprises a step, which restricts downward movement of the front portion of the rear cover relative to the meter device.

10. The motorcycle of claim 9, further comprising a wall portion extending from an edge of the second portion facing the meter device, along an outer surface of the meter device, wherein the step is opposed to a lower end surface of the wall portion.

11. The motorcycle of claim 1, wherein a stop is formed between the front portion of the rear cover and a rear edge of the front cover to restrict movement of the rear edge of the front cover in a direction toward the meter device.

12. The motorcycle of claim 1, wherein a restricting portion is formed between the peripheral wall front portion of the rear cover and a rear edge of the front cover to restrict movement of the rear edge of the front cover in a direction away from the meter device.

13. The motorcycle of claim 1, wherein an upper surface of the meter device defines a visor-shaped projecting portion on a front edge of the meter device.

14. The motorcycle of claim 13, wherein, of an outer surface of the meter device, at least a front edge of an upper surface and a display portion are formed by a lens, wherein the projecting portion is also formed by the lens.

\* \* \* \* \*